UNITED STATES PATENT OFFICE.

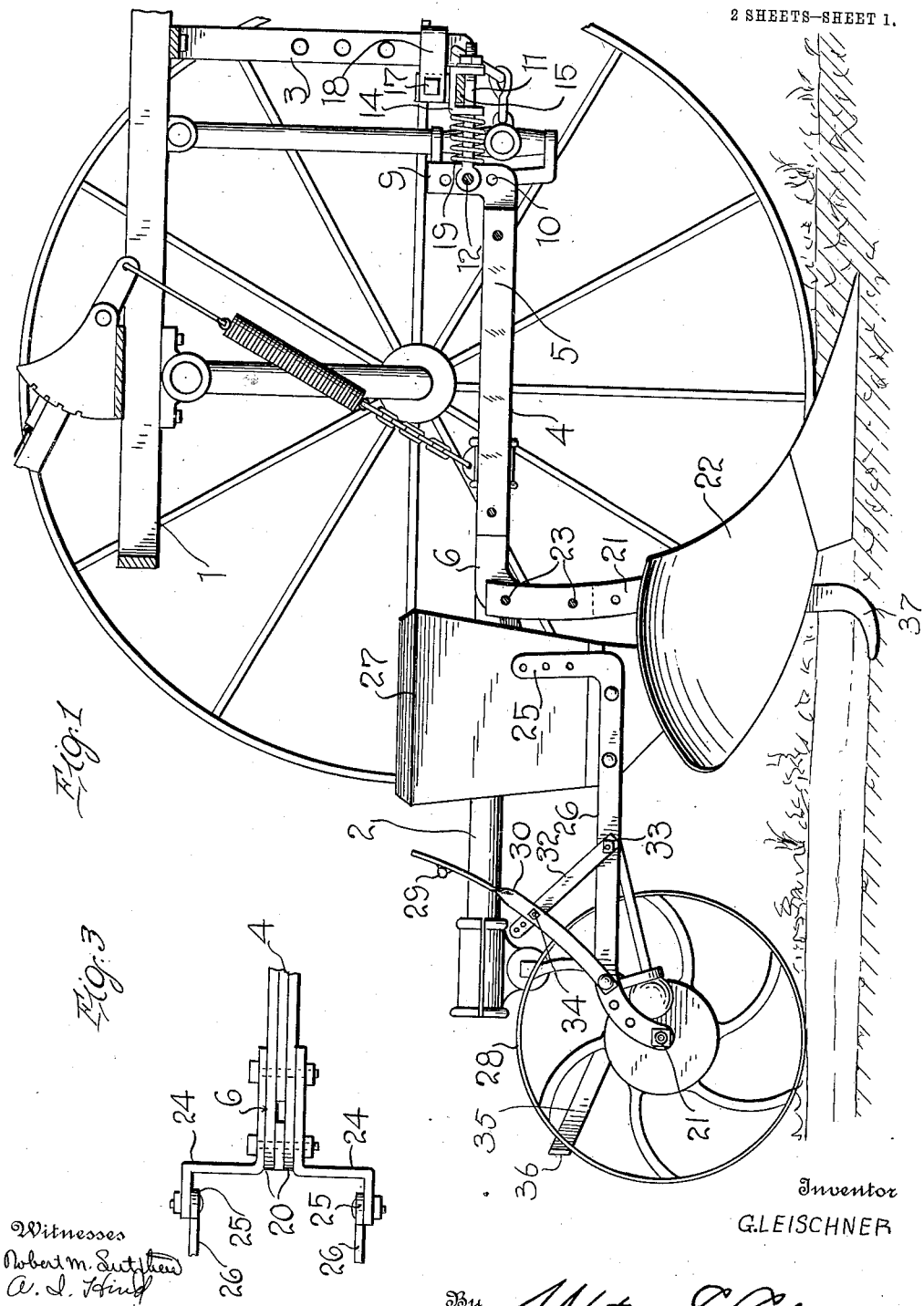

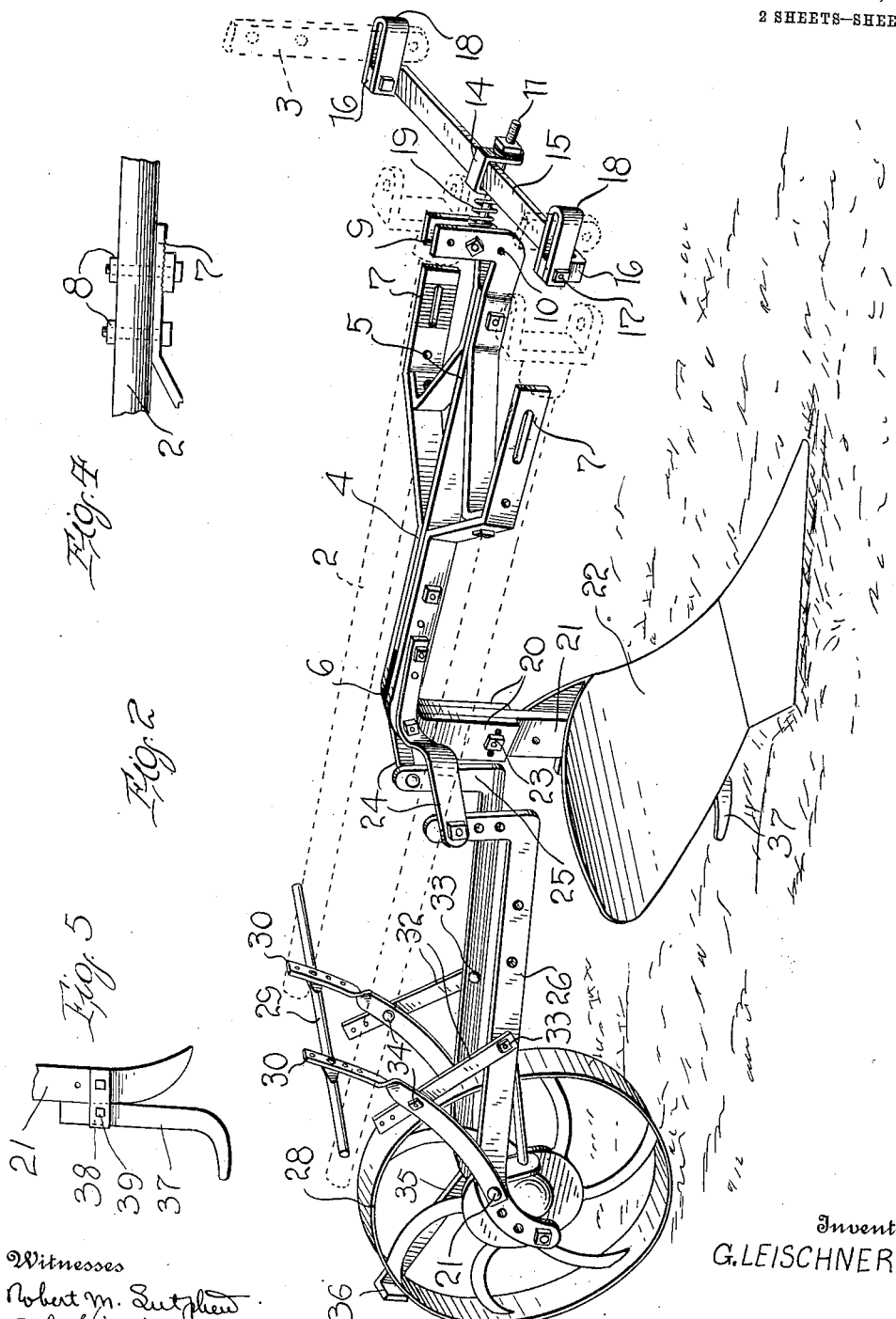

GOTTHILF LEISCHNER, OF MEGARGEL, TEXAS.

ATTACHMENT FOR CULTIVATORS.

1,100,313.  Specification of Letters Patent.  Patented June 16, 1914.

Application filed January 31, 1914. Serial No. 815,785.

*To all whom it may concern:*

Be it known that I, GOTTHILF LEISCHNER, a citizen of the United States, residing at Megargel, in the county of Archer and State of Texas, have invented certain new and useful Improvements in Attachments for Cultivators, of which the following is a specification, reference being had to the accompanying drawings.

This invention relates to certain improvements in attachments for cultivators and the object of the invention is to provide a device of this general character having novel and improved means whereby various agricultural implements, preferably a sweepstake and a planter, may be applied with facility and convenience to a cultivator of conventional form without necessitating any change in the structure of the cultivator.

The invention consists in the details of construction and in the combination and arrangement of the several parts of my improved attachment for cultivators, whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in side elevation of an attachment, constructed in accordance with an embodiment of my invention, shown in applied position, a part of the turtle frame being omitted and the coacting cultivator being shown in fragment; Fig. 2 is a view in perspective of my attachment, as illustrated in Fig. 1, with the planter omitted and the coacting parts of the cultivator being indicated by dotted lines; Fig. 3 is a fragmentary view in top plan of the tail portion of the turtle frame and the adjacent portion of the bearing frame; Fig. 4 is a fragmentary view in top plan, showing the engagement, as herein set forth, between the turtle frame and the coacting cultivator beam; and Fig. 5 is a fragmentary view in elevation illustrating a certain detail of my invention as herein embodied.

As disclosed in the accompanying drawings, 1 denotes a cultivator of conventional form including the beams 2 and suitable draft rigging 3.

My improved attachment, as herein disclosed, comprises a turtle frame 4 comprising the head 5 and the tail 6, formed preferably of metal possessing the requisite strength. As herein disclosed, the head 5 of the frame 4 is formed to afford the spaced spurs 7—7, the outer or side spurs being adapted to be connected directly to the beams 2 in any ordinary or preferred manner but I particularly desire that the connection, as indicated at 8, be of such a character as to permit a ready and convenient adjustment of the frame relative to the beams. The central or intermediate spur 7 is directed upwardly substantially perpendicular to the frame 4 and is bifurcated, as indicated at 9, the forks of such bifurcation being provided with alined openings 10, whereby an adjustable connection may be had with the connecting bolt 11, such bolt being herein shown as provided with an eye adapted to be positioned within the bifurcation 9 and through which is adapted to be directed the retaining pin 12, as is clearly shown in the drawings.

The bolt 11, as herein disclosed, is loosely directed through the yoke 14 disposed substantially central of the whiffletree 15, the extremities of such tree 15 being upwardly directed, as at 16, whereby the pivotal engagements 17 are afforded with the clevises 18, such clevises being adapted to engage an element of the draft rigging 3, whereby it will be readily perceived that when my improved attachment is in use the draft will be disposed directly to the frame from the draft rigging and thus assure the best results, as is believed to be self-evident. While believed to be self-evident, it might be well to state that with a low hitch substantially the entire pull is reverted to the frame 4 and with a high hitch the power is reverted through the cultivator proper which, under general conditions, is to be avoided.

In order to resist or release the steady draft of the team upon the tree 15, I find it of advantage to interpose between the intermediate spur 7 and the yoke 14 the coil spring 19 surrounding the bolt 11 and possessing the requisite tension.

The tail 6 of the frame 4 is provided with the depending spaced spurs 20, between which is adapted to be inserted the beam 21 of the sweep or lister 22, which beam is adapted to be operatively connected with the spurs 20 in any desired manner but preferably by the bolts 23. The tail 6 is also provided with the spaced rearwardly directed spurs 24 to which is adapted to be adjustably attached, in any conventional manner, the upstanding extremities 25 of the planter frame 26, and it is to be particularly observed that this connection between the planter frame 26 and the frame 4 is such as to permit the use of the planter frame independently of the lister or sweep 22 and vice versa. Carried by the frame 26 is the planter 27, which may be as desired; while the rear end of such frame is adapted to be supported by the press wheel 28 adjustably supported thereby. In order that the planter may be raised or lowered as desired through the movement of the beams 2 and their conventional operating levers, I find it of advantage to employ the lift bar 29 disposed above the beams 2 and fixedly secured to the arms 30, the lower extremities of which are in pivotal engagement, as at 21, with the planter frame 26. In order to control the position of the lift bar 29 relative to the frame 26, I employ the brace bars 32 pivotally engaged, as at 33, with the planter frame 26 and having their opposite extremities adapted for adjustable connection with the bars 32, as indicated at 34. It will also be self-evident that, in view of the fact that the side spurs 7 are secured to the beams 2, the conventional adjustment of such beams will serve to control the sweep or lister 22. I also find it of advantage to employ in connection with the press wheel 28 a suitable scraping element for the periphery thereof and, as herein disclosed, such element comprises an arm 35 suitably secured to the bearing frame 26 and terminating in the angular portion 36 adapted to overlie the periphery of the press wheel 28 and to suitably engage therewith.

As herein set forth, I have coacting with the lister or sweep 22 the knife 37 adjustably connected by a set screw 39 to the extension 38 projecting rearwardly of the beam 21, such knife 37 serving to cut into the ground and behind the lister or sweep 22 in order to prevent it from jumping to either side should it be brought into contact with any undue resistance, such as a stalk. It will be observed that the connection afforded by the set screw 39 permits the knife to be raised or lowered as the necessities of practice may require.

From the foregoing description, it is thought to be obvious that an attachment for cultivators constructed in accordance with my invention is of an extremely simple and comparatively inexpensive nature and is particularly well adapted for use by reason of the convenience and facility with which it may be applied into operative position and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

Having thus fully described my invention what I desire to claim and secure by Letters Patent, is:

1. In combination with a cultivator and its beams, of a frame connected to such beams, an auxiliary frame in pivotal engagement with the first frame, a lifter bar carried by the auxiliary frame and adapted to be disposed above the beams of the cultivator and adapted to be engaged thereby, and an agricultural device carried by one of such frames.

2. In combination with a cultivator and its beams, of a frame connected to such beams, an auxiliary frame in pivotal engagement with the first frame, a lifter bar carried by the auxiliary frame and adapted to be disposed above the beams of the cultivator and adapted to be engaged thereby, and an agricultural device carried by each of such frames.

3. In combination with a cultivator and its beams, of a frame connected to such beams, an auxiliary frame in pivotal engagement with the first frame, a lifter bar carried by the auxiliary frame and adapted to be disposed above the beams of the cultivator and adapted to be engaged thereby, and an agricultural device carried by the auxiliary frame.

4. In combination with a culitvator and its beams, of a frame connected to such beams, an auxiliary frame in pivotal engagement with the first frame, a lifter bar carried by the auxiliary frame and adjustable relatively thereto and adapted to be disposed above the beams of the cultivator and adapted to be engaged thereby, and an agricultural device carried by the auxiliary frame.

5. In combination with a cultivator and its beams, of a frame operatively connected with such beams, spurs projecting rearwardly of the frame, an auxiliary frame having upwardly directed extremities adapted for adjustable engagement with the spurs of the first mentioned frame, and an agricultural device carried by such auxiliary frame.

In testimony whereof I hereunto affix my signature in the presence of two witnesses.

GOTTHILF LEISCHNER.

Witnesses:
G. GRIFFITHS,
W. K. FALLER.

Copies of this patent may be obtained for five cents each, by addressing the "Commissioner of Patents, Washington, D. C."